June 23, 1964  C. D. FISHER  3,138,167
MIXER FOR FEEDS AND THE LIKE
Filed June 18, 1963  4 Sheets-Sheet 1

INVENTOR.
CHESTER DONALD FISHER
BY
Greer Marechal, Jr.
ATTORNEY

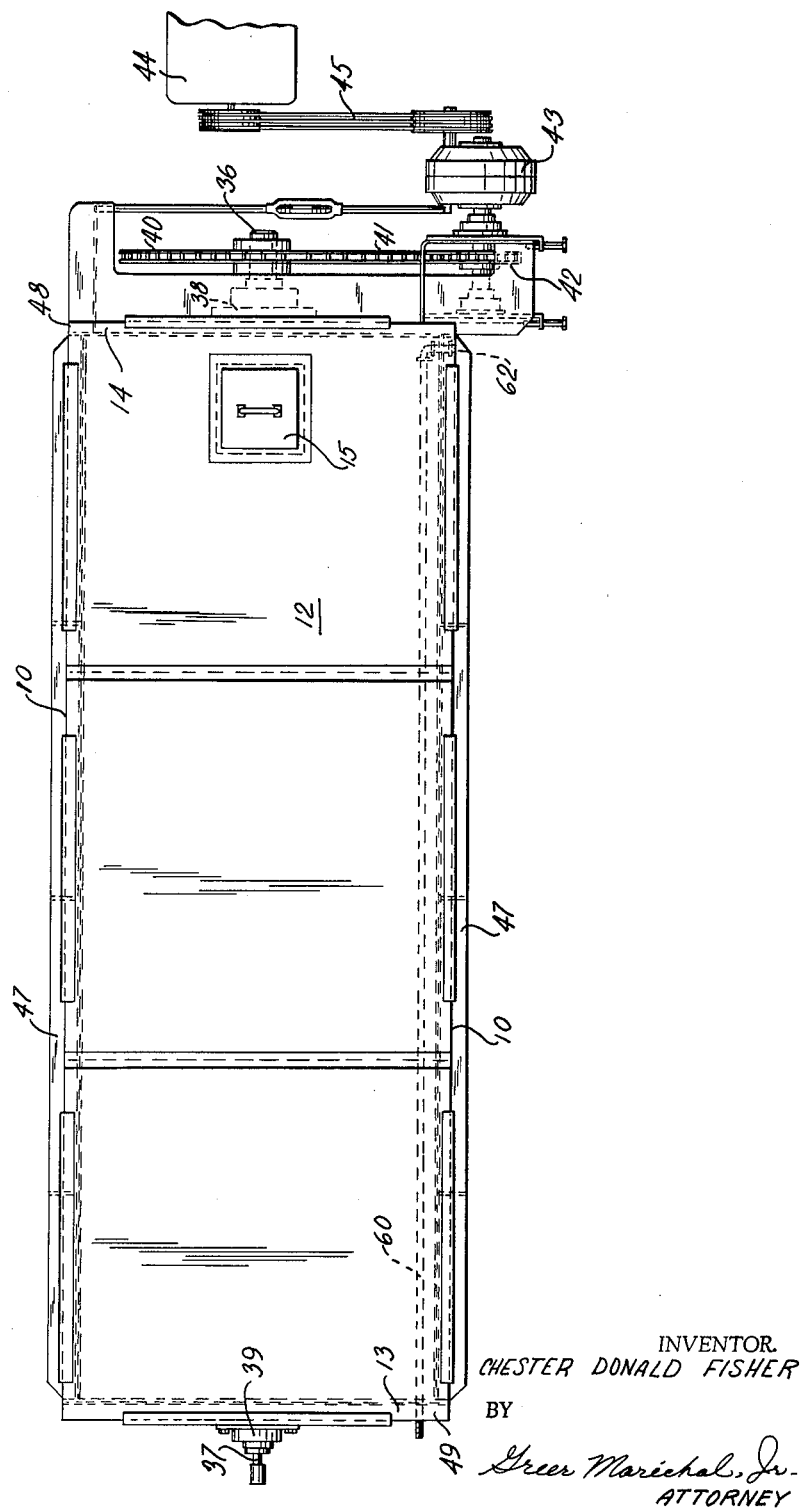

June 23, 1964

C. D. FISHER 3,138,167

MIXER FOR FEEDS AND THE LIKE

Filed June 18, 1963

INVENTOR.
CHESTER DONALD FISHER

BY

*Greer Marichal, Jr.*
ATTORNEY

June 23, 1964
C. D. FISHER
3,138,167
MIXER FOR FEEDS AND THE LIKE
Filed June 18, 1963
4 Sheets-Sheet 4
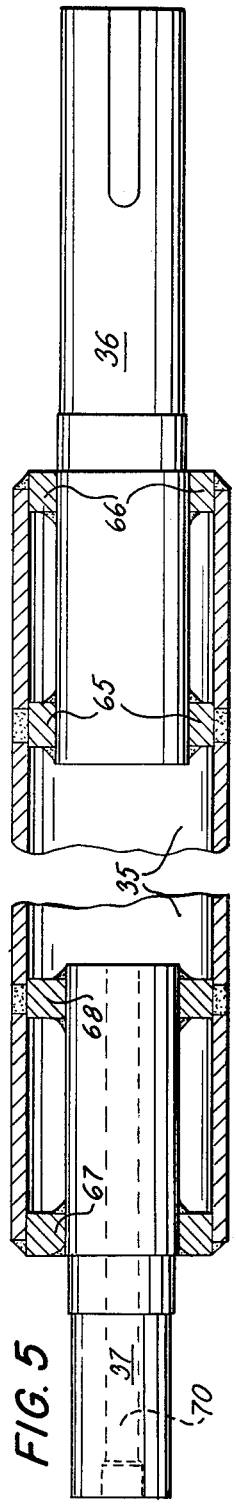
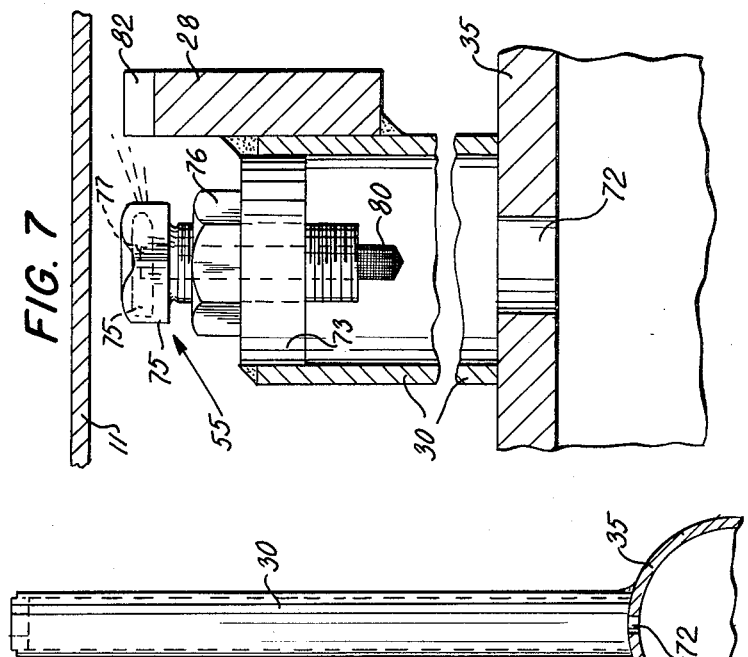
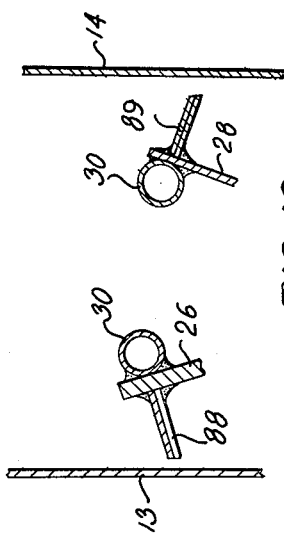
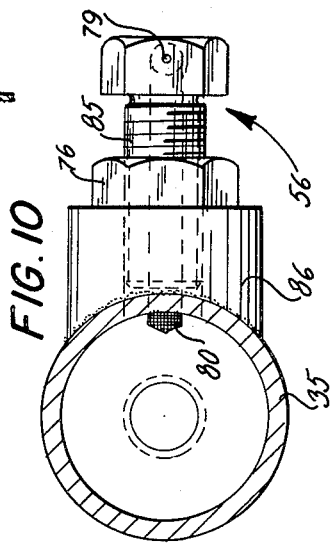
INVENTOR.
CHESTER DONALD FISHER
BY
Greer Maréchal, Jr.
ATTORNEY

United States Patent Office 3,138,167
Patented June 23, 1964

3,138,167
MIXER FOR FEEDS AND THE LIKE
Chester Donald Fisher, Muncy, Pa., assignor to Sprout Waldron & Co., Inc., Muncy, Pa., a corporation of Pennsylvania
Filed June 18, 1963, Ser. No. 288,655
15 Claims. (Cl. 134—145)

This invention relates to apparatus and devices for mixing an agitating and blending materials such as foods, grains, dry chemicals, and the like to provide substantially uniformly homogeneously blended mixtures of several ingredients and, more particularly, to providing in such apparatus and devices means such as air jets and the like for sweeping or cleaning final residues of one batch out of the mixer completely before a second batch of ingredients is introduced thereinto to avoid contamination of the second batch with residual materials left over from the first batch.

As now well understood, in the preparation of such products as animal feeds, grain mixtures, chemical mixes, etc., it may be desired to provide a plurality of various ingredients to be mixed together in large batches in such manner as to provide a substantially uniform or homogeneous blending of all the ingredients in predetermined proportions throughout the entire batch. Especially with essentially dry or pulverous materials where some of the ingredients of the final mixture may comprise as much as 50% or more thereof while other ingredients are intended to comprise no more than perhaps a fraction of 1%, achieving truly uniform or homogeneous blending throughout the entire batch may be rather difficult. Yet, such homogeneity may be quite important in situations where it is desired that each aliquot portion of the mixed batch has substantially the same proportion composition as every other portion, and particularly with products such as animal feed mixes which may include fractional proportions of drugs, antibiotics, hormones, vitamins, etc., where precise and exact dosaging thereof to the animals being fed is of the utmost importance, but is to be accomplished merely by providing a large supply of homogeneously blended ingredients for packaging, etc., into smaller batches.

Although there may be a variety of techniques and apparatus for achieving such homogeneity of mixing and blending of dry materials (or mixtures thereof in which a preponderant proportion of the ingredients are dry), those generally of the character to which this invention relates comprise introducing the ingredients to be blended into a mixing vessel of one form or another in which operates some sort of mechanical agitator means for agitating and mixing and blending the ingredients, after which the mixture is discharged from the mixing apparatus in one way or another, with such operations being either of a continuous or batch-type nature. In situations where the same mixing apparatus may be used sequentially on different mixtures of a different material, it may be quite important to avoid contamination of a second batch of material with even tiny residual proportions of a prior batch—e.g., as in the case where the first batch might contain a de-sexing or feminizing horomone for the chemical caponizing of young roosters or accentuating production of meat in live stock, while the next batch might be feed particularly designed for breeding stock.

Nevertheless, in the normal manner of construction of such mixing apparatus, the necessary or inevitable clearances between the sides of the vessel and the extremities of the agitator means therein (as well as other inevitable or necessary crevices or corners within the device) may permit retaining some residual portions of material from each batch or each operation even after the mixer has supposedly been emptied, while some materials may be sufficiently fine actually to cling to the surfaces of the agitator and shafts and the inside of dumping gates, etc. If it is attempted to arrange the structure to be completely dumped (as, for example, providing it with a completely openable bottom for dumping), certain mechanical and engineering difficulties may be encountered, particularly with larger sizes of apparatus, and such expedients may not indeed provide for complete removal of material clinging to the blades or ribbons or vanes of the agitator or inner walls of the vessel. Similarly, particularly with larger size mixers and those having agitators of substantial complexity as are routinely used in such apparatus, attempting to provide a final interior cleaning after each batch with a compressed air or steam lance, water wash, etc., may be excessively time consuming in high production operations and/or may actually require a substantial disassembly of the apparatus to permit or achieve the desired complete cleaning thereof.

According to this invention, however, there is provided apparatus for accomplishing such mixing and blending of a plurality of more or less dry materials in a variety of different proportionings for achieving substantially complete homogeneity thereof, in either continuous or batch-type operation, while also including integral means for sweeping or blowing residual components of the mixture from all interior surfaces and crevices of the mixing apparatus upon discharge of the finished mixture therefrom to assure in but a few minutes a substantially compete cleaning of the inside of the apparatus to receive a subsequent batch and without disassembling or even opening the apparatus or other substantial interruption of the continued availability thereof for mixing various materials even under high production commercial requirements. In accordance herewith, such advantages are achieved by the provision of a plurality of jets within the apparatus and/or on the agitating or other means therein and directed against the various internal surfaces thereof to eject air or other gas (or even a liquid) under pressure for sweeping or blowing or washing last residues of components of one mixture of materials out of the apparatus through the normal discharge thereof to ready the apparatus for receiving a different mixture of materials without contamination and substantially without interrupting the availability of the apparatus or requiring manual entering or cleaning thereof.

With the foregoing and additional objects in view, this invention will be more particularly described, and other objects and advantages thereof will be apparent from the following description, the accompanying drawings, and the appended claims.

In the drawings:

FIG. 2 is a top plan view of the apparatus in FIG. 1;

FIG. 5 is a detailed view partly in section and partly broken away of the center shaft of the agitator or mixing means of the apparatus of FIG. 1;

FIGS. 6 and 7 are detailed showings, partly in section and partly broken away, of the radial arms of the agitator means of FIG. 1 with the placement of air jets therein;

FIGS. 8 and 9 are detailed showings of the mounting of, respectively, the outer and inner ribbons of the agitator means of the apparatus of FIG. 1; and FIG. 10 is a detailed showing, partly in section, of jet nozzles mounted on the main agitator shaft of the apparatus of FIG. 1.

Figure 4:
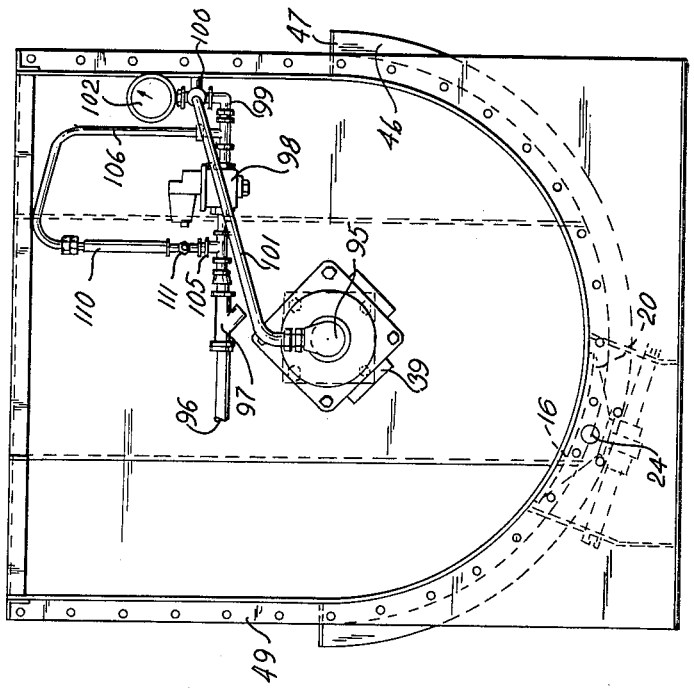
FIGS. 3 and 4 are, end elevation views of, respectively, the right and left ends of the apparatus of FIGS. 1 and 2.
Figure 3:
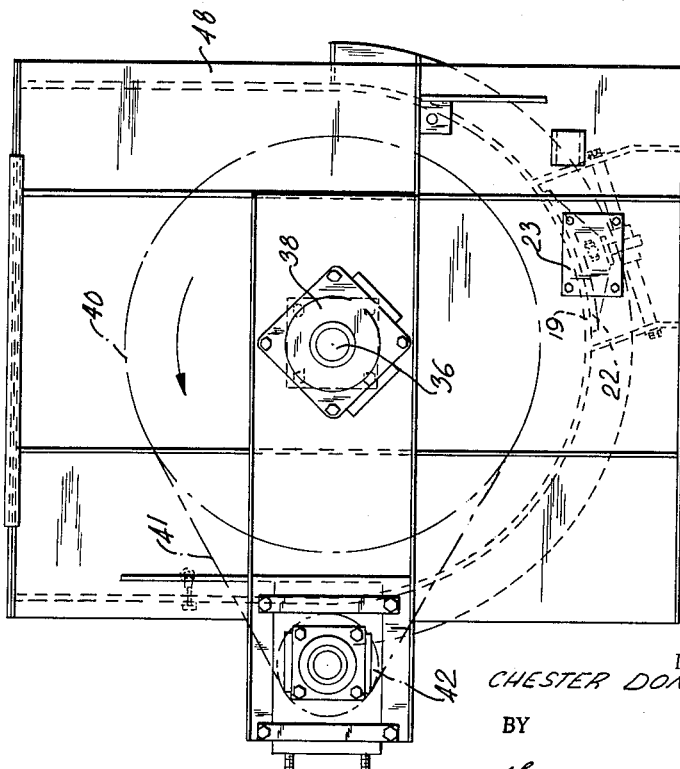

Referring to the drawings, in which like reference characters designate like parts throughout the several views thereof, there is shown mixing and blending apparatus embodying and for practicing this invention as comprising a mixing vessel including side walls 10, generally circularly curved bottom walls 11, a top plate 12, and end plates 13 and 14. An inlet hatch or opening 15 is shown (the illustrated construction being essentially a batch-type arrangement), and a plurality of discharge openings 16–19, each closed by a sliding gate 20–22, movable from the closed position shown in FIG. 1 to the right to an open position (not shown) under the action of air cylinder 23 operating control rod 24 extending along the apparatus, in well known and understood manner. As will be apparent from FIGS. 3 and 4, the various discharge openings 16–19 are preferably offset from the vertical, with due regard to the direction of rotation of the agitating means, to achieve faster and more complete discharging as the agitating means sweeps material within the apparatus around toward the discharge openings.

Figure 1:
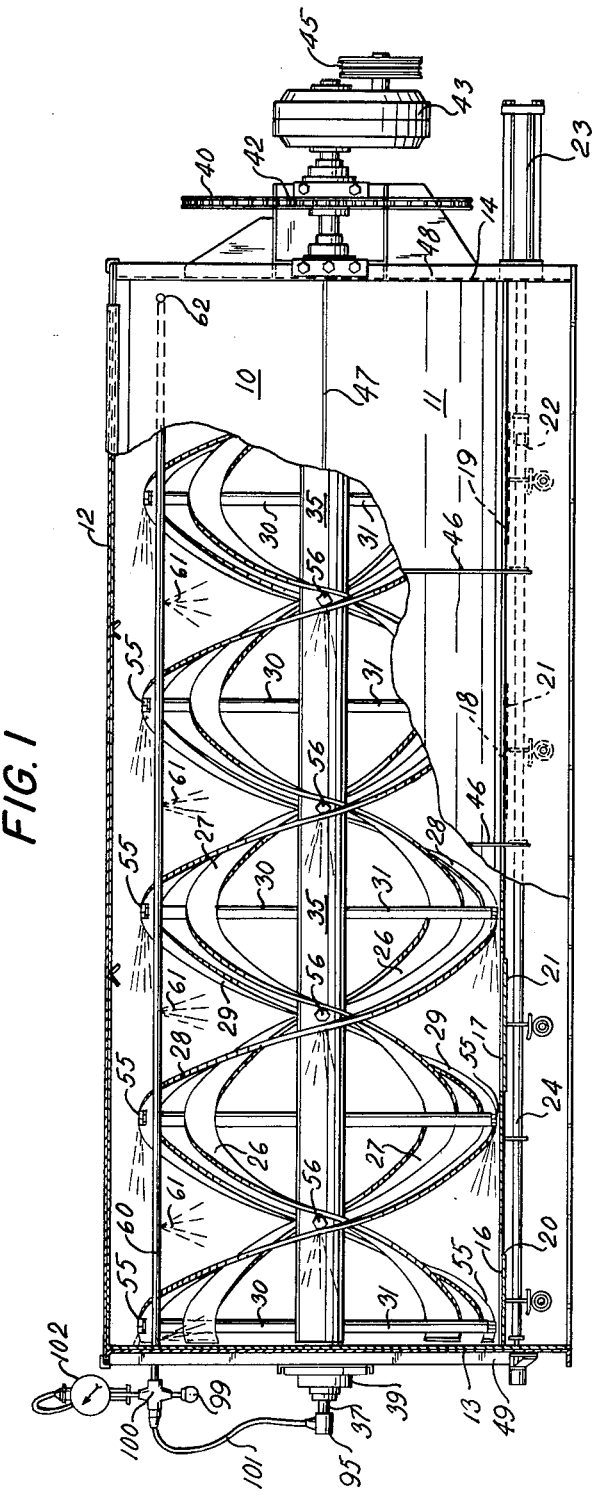
FIG. 1 is a side elevation view partly broken away of one form of apparatus embodying and for practicing this invention.

A ribbon-type agitator is illustrated in FIG. 1 as comprising radially inner and outer ribbons 26–29, mounted on radially extending arms 30 and 31 extending in pairs from opposite sides of a central shaft 35, formed as noted below as a hollow pipe. Stub shafts 36 and 37 (forming continuations of hollow shaft 35, preferably in the manner shown in FIG. 5) are journalled for rotation at 38 and 39 through end plates 14 and 13, respectively, of the device, with stub shaft 36 being driven for rotation as by chain and sprocket drive 40, 41, 42 from a conventional speed reducer 43 driven in turn, by motor 44 through a V-belt drive indicated at 45.

As will be apparent from the foregoing, materials or ingredients to be blended or mixed are charged into inlet 15, and the mixer started so that the action of the agitator mechanism or ribbons 26–29 produces the desired mixing and blending action as the agitator and its shaft 35 are rotated. When the desired amount of mixing is completed (and this time may vary from a few minutes to 15 or 20 minutes or even longer depending upon the quantity of material, the relative differences in particle size, etc., all in known manner), the various discharge gates 20–22 are opened to permit the material to discharge from discharge openings 16–19, which discharging may take anywhere from perhaps 30 seconds to several minutes depending upon the size of the mixer apparatus, the quantity of material and flow characteristics thereof, and the number of discharge openings, at which time the apparatus should desirably be ready to receive an additional batch.

As will be understood, however, and particularly with very fine powdered materials, a certain amount of the mixed ingredients will adhere to the surfaces of the agitator ribbons and the inside of the mixer container, as well as to certain crevices therein. Even if the mixing chamber is deliberately fabricated to be essentially smooth (note, for example, that the necessary rigidifying gussets or braces such as 46–49 are all on the outside of the vessel in order to leave the inside as smooth as possible), still there are opportunities for a substantial amount of residual material to remain in the apparatus after it is apparently completely emptied. For example, considering such apparatus of a size such that the mixing chamber is perhaps 18 feet long and 4½ feet wide to accommodate several hundred cubic feet of available mixing capacity, the manufacturing tolerances or precision fitting of the welded or fabricated vessel and the agitating means therein may preclude, as a practical matter, having close tolerance fitting of the peripheral extremities of the agitator means with the inner walls of the vessel so that gravity or agitator-engendered dumping of the material (particularly when the agitator is rotating at no more than 25–35 r.p.m.) does not necessarily assure complete cleaning out of the entire interior of the apparatus, especially with regard to the material which may cling to the inner walls or the agitator surfaces. Particularly regarding the latter, the situation might not be notably improved if the entire bottom of the vessel were to open completely for precipitous gravity dumping, whether or not such a mechanical expedient is impractical with regard to large mixing apparatus and the necessity for tight sealing thereof against very fine powders being mixed therein.

Nevertheless, and in accordance herewith, there is provided for sweeping or cleaning the various interior surfaces of such a mixer with blasts of compressed air or other fluid, after or during the discharge cycle thereof, so as to eliminate whatever residual portions of the materials may be clinging to the interior surfaces or trapped in crevices therein, and such air jet means are preferably provided on various portions of the rotating agitator, as well as additionally in a stationary position from which the agitator itself may be cleaned or swept.

Thus, in the illustrated embodiment, compressed air jets are provided at the radially outer ends of agitator arms 30 and 31, as indicated by the numerals 55, as well as along hollow shaft 35, as indicated by the numerals 56. Preferably, such jets on the moving agitator structure are supplemented by a plurality of jets (principally directed toward the agitator structure itself) emanating from a pipe 60 in the upper portion of the mixer apparatus and being formed by apertures therein (not shown in detail but indicated by the notation of a plurality of jet sprays designated by the numerals 61 in FIG. 1), with a cleaning port 62 being arranged at one end pipe 60 in known manner.

As will be more apparent from the detailed showings of FIGS. 5–10, a satisfactory embodiment for providing the air sweeping mechanism of the various jets noted above integrally with the normally functioning structural parts of such mixing appartus is illustrated. For example, central shaft 35 is hollow, and is supported in the apparatus and driven by virtue of stub shafts 36 and 37. As particularly noted in FIG. 5, stub shaft 36 is a solid driving shaft onto which are welded two washers 65 and 66 for welding within hollow shaft 35 as indicated. Stub shaft 37, at the opposite end of shaft 35, is similarly affixed in position by welded washers 67 and 68, and includes a hollow axial passage 70 leaving therethrough and providing flow communication from the left end of stub shaft 37 into the interior of hollow shaft 35 through which air or other fluid under pressure may be introduced into shaft 35 by a mechanism described below.

As noted in FIGS. 6 and 7, radial arms 30 and 31, supporting agitator ribbons 26–29, are really hollow pipes welded onto shaft 35 and with an opening or air passage 72 communicating between the inside of shaft 35 and each of the arms 30 and 31. At the radially outer ends of arms 30 and 31, a closure is provided, such as plug 73 welded in place, and having a threaded hole for accommodating a bolt jet 75, locked in place by a nut 76. Such bolt jet 75 is satisfactorily a machine bolt axially bored to a blind passage 77, and having another transversely extending boring 78 intersecting blind passage 77 and terminating in a small jet orifice 79—thus to provide axially of bolt 75 an air passage terminating in the head thereof as a transverse jet nozzle orifice. Preferably a filter 80 is inserted in the lower end of air passage 77 and bolt 75, and the entire assembly mounted in plug 73 in the outer end of each of the arms 30 and 31.

In this manner compressed air supplied through axial passage 70 in stub shaft 37 into the interior of hollow shaft 35 will pass therefrom through openings 72 into each of the arms 30 and 31 and, hence, out each of the jet nozzle bolts 75 as a fine and intense spray or jet of air. As noted in FIG. 7, it may be desired to have a cut-out portion 82 in outer ribbon 28 (or 29) adjacent each of the jet nozzles to avoid interruption of the jet spray thereof, which, as will be understood, is directed so as to clean or sweep the inside surfaces of the walls 10 and bottom 11 of the inclosing vessel of the disclosed mixer and to direct material encountered by the jet toward one of the discharge openings from the mixer.

Supplementing the jets 75 of the radially outer extremities of the agitator, there are also included a plurality of jets 56 mounted directly on or adjacent the central shaft 35 for sweeping the surfaces of the agitator clear of accumulated materials, and such jets are indicated in FIG. 10. Thus, a bolt 85 is axially bored (in substantially the same manner as bolt 75 in FIG. 7) and provided with a jet nozzle orifice 79 and an air filter 80, and is threaded through a stub pipe 86 welded around shaft 35 to provide the plurality of jet nozzles desired on shaft 35 and with the jet orifices thereof oriented in a manner to sweep the interior of the agitator mechanism free of occluded dusty material. Similarly, as above noted, a pluraltiy of jet orifices in pipe 60 also serves further to remove settled material from the agitator means after the entire mixer has been emptied and as supplementing the action of the rotating jet nozzles 55 and 56.

As a further feature for maintaining a substantially complete discharge of material, either by gravity or by air jet sweeping, it may also be noted that all of jets 55 and 56 are directed (as in FIG. 1) toward the left-hand end of the apparatus, at which is located discharge opening 16 controlled by a discharge gate 20. Preferably, discharge opening 16 extends clear to the end wall 13 of the apparatus, rather than being positioned spaced from that end wall, to avoid possible accumulation of residual material in the corner of the apparatus and axially beyond discharge opening 16. Similarly, as indicated primarily in FIGS. 8 and 9, the end portions of the various inner and outer ribbons as affixed to the extreme ones of arms 30 and 31 also include extra sweeping veins or blades 88 and 89 to clear material adjacent the end walls 13 and 14 of the mixing vessel as the agitating means rotates and for preventing any permanent occlusion of powdered material against the end walls particularly during cleaning of the emptying appaartus by means of the various air or fluid jets 55, 56, and 61.

The compressed air or other fluid for supplying jets 55 and 56 is introduced into hollow shaft 35 through a conventional rotary coupling 95, of known construction adapted to introduce compressed fluid through axial passage 70 and stub shaft 37 notwithstanding the rotation thereof. In the illustrated embodiment, compressed air is supplied from a conventional source thereof (not shown) through line 96 (FIG. 4) to a conventional strainer indicated at 97, from which the compressed air goes, preferably, through an automatic solenoid valve indicated at 98 for operation from a remote control location if desired, and thence through line 99 to a T arrangement 100, where the flow is split between pipe 60, serving inside the apparatus to provide the supplementary jets 61, and line 101 leading to supply rotary connection 95 for introducing fluid into the interior of hollow shaft 35 through axial passage 70 in stub shaft 37 thereof. Preferably, a pressure gage 102 is also provided for indicating the particular pressure of the supplied fluid. As will be completely understood and in conventional manner, a manually operated valve may be substituted for the remotely controlled solenoid valve 98, just as a remote recording or indicating pressure device may be substituted for a pressure gage 102.

In order to maintain the various jet orifices in elements 55, 56, and 61 clear of clogging by the various pulverous materials to be mixed in apparatus in accordance herewith, it is preferred to maintain a slight super atmospheric pressure throughout all the pneumatic elements of this device, and even during that portion of the cycle thereof which has nothing to do with the final air-swept cleaning of the apparatus. To this end, a by-pass is incorporated in the air supply of mechanism shown in the drawings and comprising a T take-off 105, by-passing air flow around solenoid valve 98, through by-pass line 106. In this manner, regardless of the settings of solenoid valve 98 or pressure gage 102 for the cleaning, there is also provided a small amount of low pressure air merely to make sure that the various jet orifices do not get clogged prior to a dumping operation when the air-sweeping function is desired.

As a further convenience, it may be preferred to include in such by-pass conduit a flow indicator, such as a ball rising or falling in a sight glass (all of which is indicated generally by the numeral 110) to maintain a general minimal flow for preventing obstructions of the various jet nozzles by the material in the mixing apparatus. Generally the adjustment of such by-passing air flow may readily be maintained by a conventional needle valve 111 to adjust the continuing air flow, through the medium of flow meter 110, to provide a desirable extent of flow continuously through the various jet nozzles in accordance herewith.

As will be understood, during the active or cleaning or air-sweeping period of the cycle after dumping of the contents of the apparatus, the pressure is increased (for example, by solenoid valve 98) to produce the ultimate sweeping or cleaning pressure (whether or not an intermediate pressure is maintained to avoid clogging of the various jet orifices). For example, about 2 cubic feet per minute of air flow has sufficed to prevent such clogging during normal operation of the mixer; whereas, ultimate air-sweeping cleaning of the entire inside of the mixer is achieved, merely as illustratively, by supplying through line 96 a source of compressed air substantially equivalent to 75 p.s.i. at a rate of about 46 c.f.m., although, as will be understood, other operating conditions will give and have given satisfactory results in accordance herewith.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, means for introducing said fluid under pressure into said vessel and through said agitator, and a plurality of jet orifices on said agitator through which said fluid is ejected under pressure to form a plurality of cleaning jets, said orifices being disposed on different parts of said agitator and oriented with respect thereto for impingement of said cleaning jets against interior surfaces of said mixing vessel for cleaning of residual material clinging thereto.

2. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, means for introducing said fluid under pressure into said vessel and through said agitator, a plurality of jet orifices on said agitator through which said fluid is ejected under pressure to form a plurality of cleaning jets, said orifices being disposed on different parts of said agitator and oriented with respect thereto for impingement of said cleaning jets against interior surfaces of said mixing vessel for cleaning of residual material clinging thereto, and additional jet orifices within said vessel and in flow communication with said source of pressure fluid forming additional cleaning jets oriented for impingement against said agitator for cleaning of residual material clinging thereto.

3. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, a hollow shaft for said agitator rotatably mounted through said vessel and having hollow spokes therearound forming said agitator, means for introducing said fluid under pressure into and through said hollow shaft and spokes of said agitator, a plurality of jet orifices on said hollow shaft and spokes of said agitator through which said fluid is ejected under pressure to form a plurality of cleaning jets, said orifices being disposed on different parts of said agitator and oriented with respect thereto for impingement of said cleaning jets against interior surfaces of said mixing vessel for cleaning of residual material clinging thereto, and additional jet orifices within said vessel and in flow communication with said source of pressure fluid forming additional cleaning jets oriented for impingement against said agitator for cleaning of residual material clinging thereto.

4. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, means for introducing said fluid under pressure into said vessel and through said agitator, a plurality of jet orifices on said agitator through which said fluid is ejected under pressure to form a plurality of cleaning jets, said orifices being disposed on different parts of said agitator and oriented with respect thereto for impingement of said cleaning jets against interior surfaces of said mixing vessel for cleaning of residual material clinging thereto and for sweeping said material toward one end of said vessel, and said outlet being disposed adjacent said one end of said vessel and flush therewith for eliminating trapped accumulations of said residual material to said outlet and downstream of said cleaning jets.

5. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, means for introducing said fluid under pressure into said vessel and through said agitator, a plurality of jet orifices on said agitator through which said fluid is ejected under pressure to form a plurality of cleaning jets, said orifices being disposed on different parts of said agitator and oriented with respect thereto for impingement of said cleaning jets against interior surfaces of said mixing vessel for cleaning of residual material clinging thereto, additional jet orifices within said vessel and in flow communication with said source of pressure fluid forming additional cleaning jets oriented for impingement against said agitator for cleaning of residual material clinging thereto, and control means accessible from outside said vessel for controlling said supply of pressure fluid and including bleed by-pass means for maintaining slight pressure fluid flow through said jet orifices during mixing of said materials in said apparatus preventing clogging of said orifices by said materials being mixed.

6. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises power means for rotating said agitator, a source of pressure fluid, a stub shaft journaled in each end wall of said vessel, one of said stub shafts having a hollow center connected to said source of pressure fluid and for receiving said pressure fluid, a horizontal rotating shaft disposed with the ends thereof on said stub shafts for supporting and rotating said agitator, a plurality of hollow spokes substantially perpendicular to and leading from said hollow rotating shaft, and a jet orifice disposed at the end of each spoke and substantially perpendicular to the axis thereof for forming cleaning jets directed generally in the direction of said outlet, said hollow stub shaft, said rotating shaft and said hollow spokes serving to direct said pressure fluid to the various of said jet orifices for impinging on and forcing residual mixed materials from said agitator and inner surfaces of said vessel during and after the discharge thereof.

7. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, power means for rotating said agitator, a stub shaft rotatably disposed in each end wall of said vessel one of said stub shafts having a hollow center connected to said source of pressure fluid and for receiving said pressure fluid and the other connected to said power means, a horizontal rotating shaft disposed with the ends thereof on said stub shafts for supporting and rotating said agitator, a plurality of hollow spokes substantially perpendicular to and leading from said hollow rotating shaft, a jet orifice disposed at the end of each spoke and substantially perpendicular to the axis thereof said orifices being directed generally in the direction of said outlet, and a plurality of jet orifices disposed along said hollow rotating shaft said orifices being directed in a direction substantially parallel to the axis of said hollow rotating shaft and toward said outlet, said hollow stub shaft, said rotating shaft and said hollow spokes serving to direct said pressure fluid to the various of said jet orifices for impinging and forcing the residue of said mixed materials from said agitator and inner surfaces of said vessel during and after the discharge thereof.

8. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, power means for rotating said agitator, a stub shaft rotatably disposed in each end wall of said vessel one of said stub shafts having a hollow center connected to said source for receiving said pressure fluid and the other connected to said power means, a horizontal rotating shaft disposed with the ends thereof on said stub shafts for supporting and rotating said agitator, a plurality of hollow spokes substantially perpendicular to and leading from said hollow rotating shaft, a jet orifice disposed at the end of each spoke and substantially perpendicular to the axis thereof said orifices being directed generally in the direction of said outlet, a plurality of jet orifices disposed along said hollow rotating shaft said orifices being directed in a direction substantially parallel to the axis of said hollow rotating shaft and toward said outlet, said hollow stub shaft, said rotating shaft and said hollow spokes serving to direct said pressure fluid to the various of said jet orifices for impinging and forcing the residue of said mixed materials from said agitator and the inner surfaces of said vessel during and after the discharge thereof, a hollow pipe running from one end wall of said vessel to the other end wall and disposed above said agitator and substantially parallel to said hollow rotating shaft and being connected to said source of pressure fluid, and a plurality of jet orifices disposed along said pipe and directed toward said agitator for impinging and removing the residue of said mixed materials from said agitator during and after the discharge of said mixed materials from said vessel.

9. Apparatus as recited in claim 8 and including means in the supply line from said source of pressure fluid for shutting off and opening said supply of pressure fluid to said jet orifices.

10. Apparatus as recited in claim 8 and including a remotely controlled solenoid valve in the supply line from said source of pressure fluid for opening and closing said supply line from said source of pressure fluid to said jet orifices, and control means for actuating said solenoid valve.

11. Apparatus as recited in claim 10 and including a by-pass line in said supply line from said source of pressure fluid around said solenoid valve for supplying a continuous substantially smaller amount of pressure fluid to said jet orifices to prevent clogging thereof during the mixing operation in said vessel.

12. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, power means for rotating said agitator, a stub shaft rotatably disposed in each end wall of said vessel one of said stub shafts having a hollow center connected to said source of pressure fluid and for receiving said pressure fluid and the other connected to said power means, a horizontal rotating shaft disposed at each end on said stub shafts for supporting and rotating said agitator, a plurality of hollow spokes substantially perpendicular to and leading from said hollow rotating shaft, a jet orifice disposed at the end of each spoke and substantially perpendicular to the axis thereof said orifices being directed generally in the direction of said outlet, said hollow stub shaft, said rotating shaft and said hollow spokes serving to direct said pressure fluid to the various of said jet orifices for impinging and forcing the residue of said mixed materials from said agitator and the inner surfaces of said vessel during and after the discharge thereof, and means in the supply line of said source of pressure fluid supply for shutting off and opening said supply of pressure fluid to said jet orifices.

13. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, power means for rotating said agitator, a stub shaft rotatably disposed in each end wall of said vessel one of said stub shafts having a hollow center connected to said source of pressure fluid and for receiving said pressure fluid and the other connected to said power means, a horizontal rotating shaft disposed at each end on said stub shafts for supporting and rotating said agitator, a plurality of hollow spokes substantially perpendicular to and leading from said hollow rotating shaft, a jet orifice disposed at the end of each spoke and substantially perpendicular to the axis thereof said orifices being directed generally in the direction of said outlet, said hollow stub shaft, said rotating shaft and said hollow spokes serving to direct said pressure fluid to the various of said jet orifices for impinging and forcing the residue of said mixed materials from said agitator and said vessel during and after the discharge thereof, a remotely controlled solenoid valve in the supply line from said source of pressure fluid for opening and closing said supply line from said source of pressure fluid to said jet orifices, control means for operating said solenoid valve, and a by-pass line in said supply line, from said source of pressure fluid around said solenoid valve for supplying a continuous substantially smaller amount of pressure fluid to said jet orifices to prevent clogging thereof during the mixing operation in said vessel.

14. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, power means for rotating said agitator, a stub shaft rotatably disposed in each end wall of said vessel one of said stub shafts having a hollow center connected to said source of pressure fluid and for receiving said pressure fluid and the other connected to said power means, a horizontal rotating shaft disposed with the ends thereof on said stub shafts for supporting and rotating said agitator, a plurality of hollow spokes substantially perpendicular to and leading from said hollow rotating shaft, a jet orifice disposed at each end of each spoke and substantially perpendicular to the axis thereof said orifices being directed generally in the direction of said outlet, a plurality of jet orifices disposed along said hollow rotating shaft said orifices being directed generally in a direction substantially parallel to the axis of said hollow rotating shaft and toward said outlet, said hollow stub shaft, said rotating shaft and said hollow spokes serving to direct said pressure fluid to the various of said jet orifices for impinging and forcing the residue of said mixed materials from said agitator and the inner surfaces of said vessel during and after discharge thereof, a remotely controlled solenoid valve in the supply line from said source of pressure fluid for opening and closing said supply line from said source of pressure fluid to said jet orifices, control means for operating said solenoid valve, and a by-pass line in said pressure fluid supply line around said solenoid valve for supplying a continuous substantially smaller amount of pressure fluid to said jet orifices to prevent clogging thereof during the mixing operation in said vessel.

15. In apparatus of the character described for cleaning from the interiors of feed mixers and the like residual material clinging thereto after materials to be mixed therein have been discharged therefrom and having a mixing vessel with an inlet and an outlet and an agitator disposed therein for mixing said materials and moving said materials from said inlet to said outlet, the combination which comprises a source of pressure fluid, power means for rotating said agitator, a stub shaft rotatably disposed in each end wall of said vessel one of said stub shafts having a hollow center connected to said source of pressure fluid and for receiving said pressure fluid and the other connected to said power means, a horizontal rotating shaft disposed with the ends thereof on said stub shafts for supporting and rotating said agitator, a plurality of hollow spokes substantially perpendicular to and leading from said hollow rotating shaft, a jet orifice disposed at each end of each spoke and substantially perpendicular to the axis thereof said orifices being directed generally in the direction of said outlet, a plurality of jet orifices disposed along said hollow rotating shaft said orifices being directed generally on a direction substantially parallel to the axis of said hollow rotating shaft and toward said outlet, said hollow stub shaft, said rotating shaft and said hollow spokes serving to direct said pressure fluid to the various of said jet orifices for impinging and forcing the residue of said mixed materials from said agitator and the inner surfaces of said vessel during and after discharge thereof, a hollow pipe running from one end wall of said vesesl to the other end wall and disposed above said agitator and substantially parallel to said hollow rotating shaft and being connected to said source of pressure fluid, a plurality of jet orifices disposed along said pipe and directed toward said agitator for impinging and removing the residue of said mixed materials from said agitator during and after the discharge of said mixed materials from said vessel, a remotely controlled solenoid valve in the supply line from said source of pressure fluid for opening and closing said supply line from said source of pressure fluid to said jet orifices, control means for operating said solenoid valve, and a by-pass line in said pressure fluid supply line around said solenoid valve for supplying a continuous substantially smaller amount of pressure fluid to said jet orifices to prevent clogging thereof during the mixing operation in said vessel.

References Cited in the file of this patent
UNITED STATES PATENTS

| | | |
|---|---|---|
| 1,825,261 | Burns | Sept. 29, 1931 |
| 2,497,171 | Jones | Feb. 14, 1950 |
| 2,735,794 | Pletcher | Feb. 21, 1956 |